United States Patent [19]
Persson

[11] 4,291,927
[45] Sep. 29, 1981

[54] INTEGRAL FOAMED PLASTIC SLIDING BEARINGS

[75] Inventor: Stig Persson, Katrineholm, Sweden

[73] Assignee: SKF Industries, Inc., King of Prussia, Pa.

[21] Appl. No.: 16,977

[22] Filed: Mar. 2, 1979

Related U.S. Application Data

[63] Continuation-in-part of Ser. No. 811,966, Jun. 30, 1977, abandoned.

[30] Foreign Application Priority Data

Oct. 18, 1976 [SE] Sweden .............................. 7611518

[51] Int. Cl.³ ............................................. F16C 33/66
[52] U.S. Cl. .................................. 308/121; 308/243
[58] Field of Search ......... 308/5 R, 243, 240, DIG. 5, 308/DIG. 7, DIG. 8, 125, 124, 121; 184/5, 100; 252/12.2

[56] References Cited

U.S. PATENT DOCUMENTS

| | | | |
|---|---|---|---|
| 857,845 | 6/1907 | Stewart | 252/12.2 |
| 2,807,803 | 9/1957 | Rockwell | 308/243 |
| 2,919,964 | 1/1960 | Evans | 308/243 |
| 3,109,684 | 11/1963 | Tupper | 308/240 |
| 3,431,203 | 3/1969 | Hartmann et al. | 252/12.2 |

FOREIGN PATENT DOCUMENTS

200353 9/1967 U.S.S.R. .............................. 308/240

*Primary Examiner*—Lenard A. Footland
*Attorney, Agent, or Firm*—Eugene E. Renz, Jr.

[57] ABSTRACT

Sliding bearings of all types, including axial, radial, and linear bearings and combinations thereof, are described which are composed of integral foamed molded plastic by processes known in the art per se to provide unitary bearing structures having surface and/or interior portions of hard material and surface and/or interior portions of porous material, said porous material being saturated with a lubricant and acting to release said lubricant to a sliding bearing.

3 Claims, 6 Drawing Figures

INTEGRAL FOAMED PLASTIC SLIDING BEARINGS

This application is a continuation-in-part of U.S. Patent Application Ser. No. 811,966, abandoned, filed June 30, 1977 entitled SLIDING BEARING.

BACKGROUND OF THE INVENTION

The present invention relates to improved sliding bearings and is applicable to all bearings of that type including axial bearings, radial bearings, and combination axial and radial bearings and is especially suited to self-lubricating bearings for use under compartively light loads.

THE PRIOR ART

Self-lubricating sliding bearings have been known in the art for many years. Such bearings have generally consisted of a relatively rigid, usually metallic housing, containing some sort of low friction material. For example, Stewart U.S. Pat. No. 857,845 issued June 25, 1907 teaches the use of shredded bearing metal such as Babbitt metal, lead or other suitable material in a shell or holder of cast metal. The bearing metal is first comminuted, immersed in water and then immersed in a lubricant such as graphite before it is compressed into the shell or holder.

Rockwell U.S. Pat. No. 2,807,803 issued Sept. 24, 1957 describes a bearing having an oil-saturated core of cellular resilient material such as sponge rubber or sponge plastic, which is disposed in the bottom of the journal box of a railway car axle journal. These cores are said to be stiffened against lateral compression by providing them with a stiffening layer which may be in the form of a skin surface molded with the core or a part of a longer resilient body from which the core is made.

Tupper U.S. Pat. No. 3,109,684 issued Nov. 5, 1963 shows a porous bearing fed by a porous lubricant pad enclosed by a housing of a hard material.

Evans U.S. Pat. No. 2,919,964 issued Jan. 5, 1960 relates to journal box lubrication in the form of a lubricator pad composed of a stable foam material saturated with oil for use in the journal boxes of railroad cars.

Russian Pat. No. Publication 200,353 of July, 1967 relates to a slip bearing in which a bush in a body has a cavity filled with a hygroscopic material permeated with a lubricant.

Hartmann et al U.S. Pat. No. 3,431,203 issued Mar. 4, 1969 describes a self-lubricating thermoplastic bearing material composed of a closed-pore type of porous polyolefin impregnated with a lubricant. This bearing material is used is sewing machines, food machinery and the like which support the bearing material.

Many self-lubricating bearings have also been described in the prior art in which a lubricant is provided in the pores of a sintered material. In other available bearings, the sliding surfaces are provided by graphite or polytetrafluoroethylene. While such bearings are effective, they tend to be relatively expensive and, therefore, unsuitable for simple applications where the required low load supporting capacity does not warrant the expense of such materials and the factors of low cost and ease of handling become more important.

In view of the foregoing it is seen that while a wide variety of oil or lubricant-saturated porous bearing materials have been proposed in the prior art, in all instances the bearing material has required support by an associated separate physical structure such as a bearing bushing, journal box or the like.

It is apparent, therefore, that there has been a need in the art for a self-supporting, self-lubricating bearing material and for simple unitary sliding bearings.

It is an object of the present invention, therefore, to provide simple, self-supporting, self-lubricating bearings.

It is another object of the invention to provide a new porous bearing material capable of absorbing a lubricant and releasing it to a bearing surface in use, which material does not require a separate supporting structure.

It is another object of the invention to provide novel unitary bearings which can be molded in a single operation.

It is still another object of the invention to provide self-supporting self-lubricating bearings of unitary molded plastic which have a relatively dense shell supporting structure and a porous portion capable of absorbing a lubricant and releasing it during use to a bearing surface of the unitary structure.

It is yet another object of the invention to provide a sliding bearing which can be manufactured at low cost, which is easy to handle and which can readily be made self-lubricating.

Still another object of the invention is to provide economical and highly versatile self-lubricating sliding bearings in a wide variety of designs adapting them for almost universal application.

SUMMARY OF THE INVENTION

The foregoing and other objects of the invention which will become apparent hereinafter, are achieved by forming a sliding bearing having a unitary plastic structure by known structural foam molding processes to produce a bearing having a sliding bearing surface, a porous portion in communication with the sliding bearing surface, and a shell having a greater strength than the porous portion to render the unitary bearing self-supporting. The porous portion of the unitary bearings is impregnated with a liquid lubricant which is released to the sliding bearing surface during use.

The shell of the unitary bearings may be on the entire exterior surface or only a portion thereof or in certain cases may even be internal, e.g. by defining a bore or chamber within the body of the bearing. The shell may be composed of the same or a different plastic from the porous portion, but is molded in a unitary integrated mass with the porous portion of the bearing. The shell and porous portions of the unitary bearing are normally molded simultaneously and from the same plastic. In this case the shell will have a greater density than the porous portion in order to provide the desired structural strength to make the bearing as a whole, self-supporting. When two or more different plastics are used to form the shell, porous portion and sliding surface of the unitary bearing, they may be molded simultaneously or sequentially as desired, but in any case, the finished bearing will be an integrated unitary all plastic bearing.

DETAILED DESCRIPTION OF THE INVENTION

Figure 1:
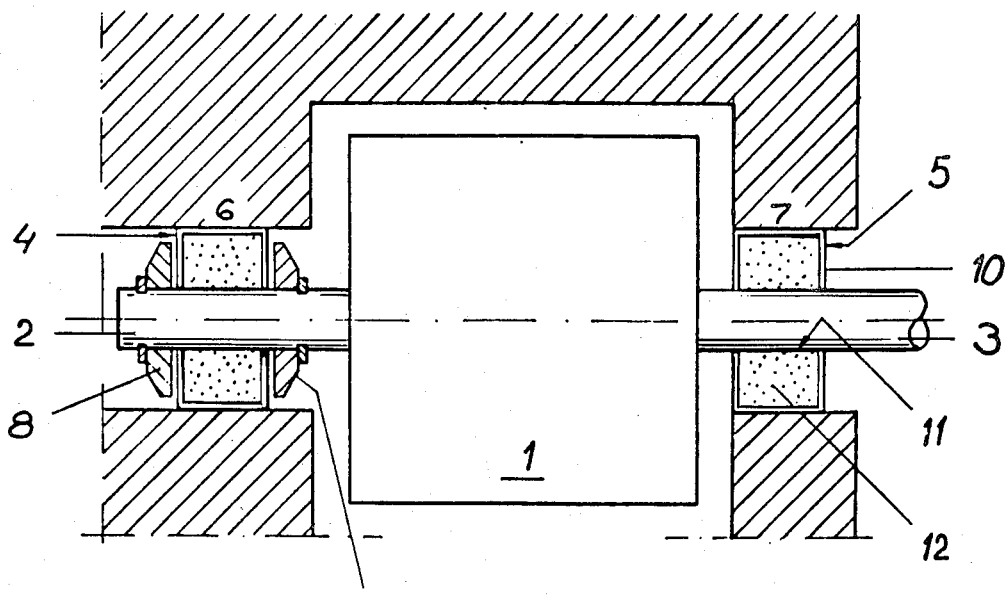
FIG. 1 is a vertical axial sectional view through a rotor journaled in a pair of radial sliding bearings of the invention.

FIG. 1 shows an axial section through a portion of an application incorporating a rotor 1 having two journals 2 and 3. These journals are enclosed by a pair of radial sliding bearings 4 and 5 fitted in seats 6 and 7, respectively, in a bearing housing. Journal 2 is also provided with axial guiding members 8 and 9 which cooperate with the side surfaces of the bearing 4.

Each of the bearings 4 and 5 have an exterior shell 10 which is relatively hard and provides physical support for the bearing as a whole. The bearings also include sliding bearing surfaces 11 in contact with the journals 2 and 3 of the rotor. These bearing surfaces are composed of the porous portion 12 of the interior of the bearing. The porous portions 12 of the bearings are impregnated with a suitable liquid lubricant such as an oil of lubricating viscosity which is constantly fed to the sliding bearing surfaces 11 during use. As will be explained in greater detail below the shell 10 of the bearings may be composed of the same plastic as the porous portions 12 and sliding bearing surfaces 11 which has been densified during manufacture to provide added hardness and strength. Alternatively, the shell may be made of a plastic different from that of the porous core and selected to provide the desired hardness and strength.

Figure 2:
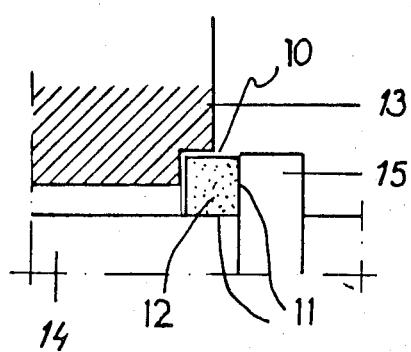
FIG. 2 is a vertical axial sectional view through a combination radial and axial sliding bearing of the invention.

FIG. 2 shows an axial section through a combined radial and axial sliding bearing fitted in a housing 13. The sliding bearing surfaces of the bearing are in contact with shaft 14 and a radial flange 15 on the shaft. Here again the shell 10 covers the exterior of the bearing and the sliding surfaces are inner surfaces of the oil-impregnated inner porous core 12.

Figure 3:
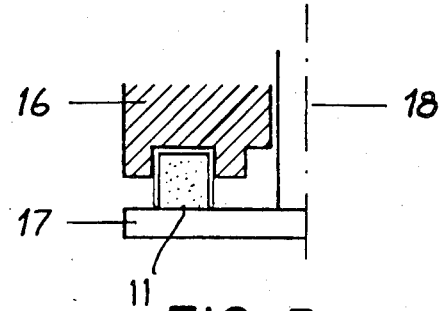
FIG. 3 is a vertical axial sectional view through an axial bearing.

FIG. 3 shows an axial section through an axial sliding bearing arranged in an annular groove in a housing 16. The sliding bearing surface 11 contacts a radial surface on a disc 17 which is rotatable about an axis 18 relative to the housing 16. The hard shell 10 supports the bearing in the housing 16 and also outside of the housing.

Figure 4:
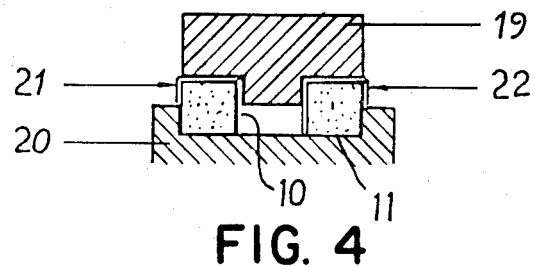
FIG. 4 is a cross-sectional view through a linear sliding bearing.

FIG. 4 shows in cross-section a linear sliding bearing. A movable carriage 19 is displaceble along a guide 20 provided with a groove. The walls and bottom of the groove are engaged by the lower sliding bearing surfaces 11 of the rod-like bearings 21 and 22 mounted on the carriage 19. The shells 10 of the bearings provide support therefor, and surfaces for attachment to the carriage 19.

Figure 5:
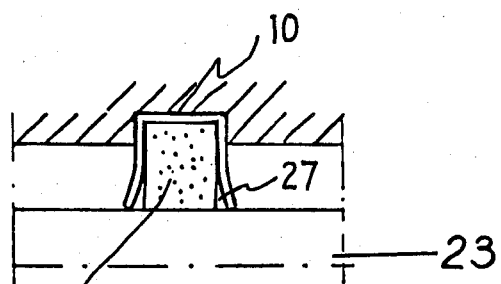
FIG. 5 is a cross-sectional view through a radial bearing supporting a shaft.

FIG. 5 shows a radial sliding bearing for supporting an underlying shaft 23. In order to provide improved resiliency and lubricant sealing, the shell 10 of the bearing is partially separated from the porous core 12 containing the liquid lubricant. This partial separation may be accomplished by cutting or any other suitable means; the unsevered remainder of the shell remaining integral with the porous portion of the bearing.

Figure 6:
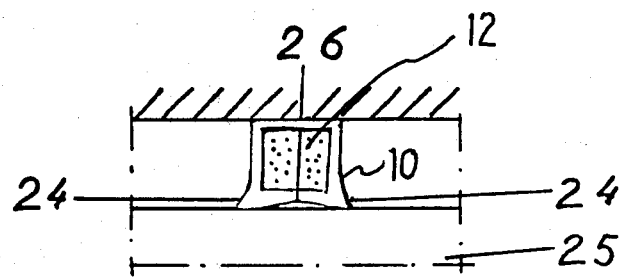
FIG. 6 is a cross-sectional view of another embodiment of a radial bearing.

FIG. 6 shows another embodiment of a radial bearing in which the porous core is essentially fully encased in the hard shell 10. Moreover, in this embodiment it is the lower surfaces of engagement portions 24 of the hard shell 10 which act as the sliding bearing surfaces in contact with a shaft 25. The liquid lubricant from the porous core 12 passes through the bores or slots 26 communicating with the sliding bearing surfaces 24. A free space is provided between the engagement portions 24 to receive lubricant and permit it to accumulate between the engagement portions 24 and to flow between their lower surfaces and the shaft 25.

From the foregoing many other embodiments of the invention will be apparent to those skilled in the art. All of the many embodiments of the present invention, however, have in common an integrated, unitary, i.e. one-piece structure, including a porous portion carrying absorbed liquid lubricant, a shell having greater structural strength than the porous portion, and a sliding bearing surface of either porous or shell plastic in communication with the liquid lubricant in the porous portion.

MANUFACTURE

As noted above, the novel unitary, self-supporting, self-lubricating sliding bearings of the present invention are manufactured by structural foam molding processes known per se in the art but not having been employed previously in the production of the novel bearings. Such processes are described in the prior art, an excellent summary being that of J. F. Rocky, Jr. in an article entitled "Melt-processible Structural Foam Molding" at pages 290-291 of *Modern Plastics Encyclopedia* (1976-1977).

In the article referred to, it is noted that structural foam molding processes produce parts composed of a cellular core and integral solid skins or shells from virtually any thermoplastic. Such structures have a high stiffness-to-weight ratio at a density less than that of solid plastic; the flexural modulus being four to five times that of an equal weight of solid material. This, of course, provides the self-supporting character of the unitary plastic bearings of the present invention.

Structural foam was first introduced commercially in the late 1960's but is was not recognized until the present invention that it could be used to provide low cost, self-supporting, self-lubricating bearings having a unitary structure. In general there are two basic types of structural foam molding processes i.e. high pressure and low pressure processes.

In the high pressure processes, the structural foam molding machines are designed to completely fill the mold cavity at injection and packing pressures typical of injection molding procedures. For this reason, such processes generally produce good part finishes because the surface of the melt in contact with the mold (usually of steel) solidifies while under pressure. The interior portion of the molded part is then foamed by the expansion of the mold or contraction of the mold core. These high pressure processes require expensive tooling and, therefore, while capable of producing the bearings of the invention, are not preferred for that reason. Moreover, such processes impose certain design limitations and require the use of single cavity molds of restricted size. These high pressure processes also require the use of chemical blowing agents and thus are sensitive to operate. One such process called the USM process uses conventional Farrel injection molding machines fitted with a special foam molding package that permits delivery of a full shot under normal injection molding pressure. Elements of the mold usually the core, are then moved to permit foaming of the core of the molded object.

The TAF process is similar to the USM process but relies upon a special blowing agent concentrate. This process is especially useful for styrenic plastic materials.

Of the high pressure processes, the ICI sandwich process is most useful in making the new bearings, since it uses two injection units, one for the solid skin or shell polymer, and another, containing a blowing agent, for the porous portion of the bearing. The two polymers may be the same or different, in order to achieve the desired high density shell if the polymers are the same, or a stronger shell if the polymers are different. In this process, a portion of the shell polymer is injected into the mold first, followed by the material for the porous core, and then the remainder of the shell polymer is added, thus forming a sandwich structure. The mold is held at full clamping pressure for a few seconds and then opened slightly to allow foaming of the core.

In the low pressure molding processes, which are generally preferred in this invention, a short shot of plastic is injected into the mold so that it is not completely filled. This results in depressurization of the plastic melt, causing it to foam rapidly due to the presence of the blowing agent, thus causing expansion of the plastic to fill the mold. In this way, the clamp need only resist the pressure of the expanding melt and not the full pressure. For this reason internal mold pressures range from about 200 to 400 psi only thus requiring only relatively low clamp tonnages. A 300-ton press, for example, can accommodate parts in excess of 60 lbs of plastic thus requiring much lower cost equipment than a high pressure process.

The low pressure processes also have the advantage of producing only very low molded-in stresses in the bearings, thus permitting the production of large bearings of intricate shapes free of sink marks or warp. Many companies are now offering complete systems for low-pressure structural molding which differ in certain respects.

For example, the blowing agent may be liquid or gaseous and even solid chemical blowing agents may be used. Nitrogen gas is widely used because of its low cost, ready availability and ease of handling. The liquid fluorocarbons are also desirable blowing agents, since they provide a uniform cell structure. Both nitrogen and fluorocarbons may be used with any resin and thus are preferred to chemical blowing agents which are more difficult to control in use.

A few manufacturers of low pressure structural foam processes also offer two-component systems, using two extruders so that different plastics may be used for the shell and porous core. This permits a less expensive resin to be used for the porous core.

It is apparent, therefore, that the technology is commercially available to produce the novel bearings of the present invention at low cost, thus providing a wide variety of self-supporting, self-lubricating sliding bearings of integrated unitary plastic structure embodying a lubricant-filled porous core, a shell providing structural support and integrity and a sliding bearing surface in communication with the lubricant.

The molded shapes may be further manufactured, if desired by cutting, drilling or otherwise shaping the molded articles. The liquid lubricant may be incorporated in any suitable manner as by soaking the porous portion of the bearing in the lubricant or by impregnation under a negative pressure, if desired.

What is claimed is:

1. A linear sliding bearing supporting a carriage for longitudinal movement relative to a guide with a groove, said sliding bearing comprising a pair of elongated rod members, each rod member made of a foamed plastic material consisting of at least one homogeneous liquid impermeable hard and rigid peripheral surface shell portion of generally L-shaped configuration and a porous core portion filled with a lubricant confronting and engaging the sidewall and bottom of the groove of said guide, said elongated rod members mounted so that the hard rigid peripheral surface portion engages the carriage and provides a physical support for maintaining the carriage in a predetermined spaced relation to the guide.

2. A unitary, one-piece radial sliding bearing supporting a rotatable shaft in the opening of the housing comprising a single, one-piece annular member in the annular space between the housing and shaft and made of a foamed plastic material consisting of at least one homogeneous, liquid impermeable hard and rigid peripheral surface shell portion of U-shaped configuration and at least one porous core portion of the same material filled with a lubricant, said sliding bearing adapted to be mounted between said housing and shaft so that the hard and rigid peripheral surface shell portion seats in said housing and the porous portion confronts the peripheral surface of the shaft, said shell being partially separated from said porous core in the area where it engages the shaft to provide improved resiliency and lubricant sealing, said outer shell providing a physical support for maintaining the members in a predetermined spaced relation.

3. A unitary, one-piece radial sliding bearing supporting a rotatable shaft in the opening of the housing comprising a single, one-piece annular member in the annular space between the housing and shaft and made of a foamed plastic material consisting of at least one homogeneous, liquid impermeable hard and rigid peripheral surface shell portion and a porous core portion of the same material filled with a lubricant and encapsulated in said shell, said sliding bearing adapted to be mounted between said housing and shaft so that the hard and rigid peripheral surface shell portion seats in said housing, the shell having a pair of circumferentially extending lips projecting inwardly to engage the shaft at axially spaced locations and define therebetween a chamber, means defining a plurality of circumferentially spaced openings in said shell to permit lubricant to flow from said core to said chamber.

* * * * *